United States Patent Office 3,531,546
Patented Sept. 29, 1970

3,531,546
ALKYLATION OF ORGANIC COMPOUNDS
George L. Hervert, Downers Grove, Ill., assignor to Universal Oil Products Company, Des Plaines, Ill., a corporation of Delaware
No Drawing. Filed Nov. 29, 1967, Ser. No. 686,690
Int. Cl. C07c 3/54, 39/06
U.S. Cl. 260—683.51                    4 Claims

ABSTRACT OF THE DISCLOSURE

The alkylation of organic compounds is effected in the presence of a novel catalyst comprising the hydrogen fluoride-carbon dioxide complex to prepare alkylated products possessing certain desirable configurations.

---

The present invention is concerned with a process for the alkylation of organic compounds in the presence of certain catalytic compositions of matter. More particularly, the invention is concerned with the use of novel catalytic compositions of matter comprising a hydrogen fluoride-carbon dioxide complex to effect the alkylation of certain organic compounds whereby a desirable product is obtained.

Heretofore, it has been known to utilize acidic catalysts to effect certain reactions involving organic compounds such as hydrocarbons or substituted hydrocarbons. These acidic catalysts which have been used in the prior art include sulfuric acid, hydrogen fluoride, etc. However, when utilizing these catalysts only limited yields of the more desirable products are obtained. In order to increase the yield of the desirable products it is necessary to modify the catalyst system.

It is therefore an object of this invention to provide a process for effecting certain organic reactions in the presence of a novel catalyst system.

A further object of this invention is to provide a process for effecting certain organic reactions such as alkylation in the presence of a novel catalyst system comprising a hydrogen fluoride-carbon dioxide complex.

In one aspect, an embodiment of this invention resides in a process for the alkylation of an alkylatable compound with an alkylating agent which comprises condensing said compound with said alkylating agent in the presence of an alkylation catalyst comprising a hydrogen fluoride-carbon dioxide complex at alkylation conditions, and recovering the resultant alkylated compound.

A specific embodiment of this invention is found in a process for the alkylation of isobutane which comprises condensing said isobutane with 1-butene in the process of a catalyst comprising a hydrogen fluoride-carbon dioxide complex at a temperature in the range of from about $-20°$ to about $150°$ C. and at a pressure in the range of from about 10 to about 2000 pounds per square inch and recovering the resultant alkylated product, a major portion of which comprises trimethylpentane.

Other objects and embodiments will be found in the following further detailed description of this invention.

As hereinbefore set forth, the present invention is concerned with a process for effecting certain organic reactions in the presence of a catalyst comprising a hydrogen fluoride-carbon dioxide complex. By utilizing a catalyst complex it is possible to modify the aforementioned organic reactions in order to obtain a preferred product distribution. A specific example of the process of the present invention is the alkylation of isoparaffins or aromatic compounds with alkylating agents in the presence of the catalyst composite of the present invention whereby a preferred isomeric product is obtained. For example, by alkylating an isoparaffin such as isobutane with an alkylating agent such as 1-butene in the presence of a hydrogen fluoride-carbon dioxide catalyst complex, the amount of trimethylpentanes which is obtained is increased with a corresponding reduction in the amount of dimethylhexanes. This is especially beneficial inasmuch as the trimethylpentanes possess octane numbers considerably in excess of the octane numbers possessed by the dimethylhexanes. It is readily apparent that this is a desired reaction, especially when producing motor fuels.

While the aforementioned discussion has been centered about an alkylation reaction, it is also contemplated within the scope of this invention that the hydrogen fluoride-carbon dioxide complex may also be used to effect other than organic reactions such as isomerization, whereby the double bond arrangement of a particular olefinic compound will be altered, i.e. shifting of a double bond toward a more central position in an olefinic compound, in order to afford products which find greater use in other reactions than do the original compounds. Examples of compounds which cay undergo alkylation according to the process of this invention include isoparaffins such as isobutane, isopentane, isohexane, etc., normal paraffins such as n-butane, n-pentane, n-hexane, etc., aromatic hydrocarbons such as benzene, toluene, o-xylene, m-xylene, p-xylene, ethylbenzene, cumene, etc., substituted aromatic compounds such as phenol, thiophenol, resorcinol, quinone, anisole, ethoxy benzene, propoxy benzene, etc.

It is also contemplated within the scope of this invention that the catalyst complex hereinafter set forth in greater detail may also be used to effect the alkylation of aromatic compounds using carbohydrates as the alkylating agents. The alkylaromatic hydrocarbons which may be alkylated comprise those which are subject to the limitation that the alkylaromatic hydrocarbon contains adjacent unsubstituted carbon atoms (the alkylaromatic hydrocarbon must contain two carbon atoms in orthoposition to one another, these two carbon atoms being bonded solely to other carbon atoms and to hydrogen) such hydrocarbons including benzene, ethylbenzene, n-propylbenzene, isopropylbenzene, n-butylbenzene, isobutylbenzene, sec-butylbenzene, tert-butylbenzene, etc.; dialkylated aromatic hydrocarbons such as o-xylene, m-xylene, p-xylene, o-ethyltoluene, m-ethyltoluene, p-ethyltoluene, etc. and higher molecular weight dialkyl aromatic hydrocarbon sometimes referred to in the art as alkylate, including hexyltoluene, nonyltoluene, dodecyltoluene, pentadecyltoluene, etc. In addition, it is also contemplated that polyalkylated aromatic hydrocarbons may also be alkylated, said hydrocarbons including 1,2,3-trimethylbenzene, 1,2,4-trimethylbenzene, etc. Other suitable utilizable aromatic hydrocarbons include those with two or more aryl groups such as diphenyl, diphenylmethane, triphenylmethane, fluorene, stilbene, etc., as well as aromatic hydrocarbons which contain condensed benzene rings including naphthalene, anthracene, phenanthrene, crysene, etc. Examples of carbohydrates which may be utilized as alkylating agents for the aromatic compounds include aldohexoses and their di-, tri- and polyforms. Simple aldohexoses which may be used include mannose, glucose, idose, gulose, galactose, talose, allose and altrose. Utilizable aldohexose disaccharides include turanose, maltose, lactose, and trehalose. Various polysaccharides which yield aldohexoses during the reaction are also utilizable and will include starch, cellulose, dextran, etc.

Examples of compounds which may undergo isomerization when utilizing a hydrogen fluoride-carbon dioxide catalyst complex will include 1-butene, 1-pentene, 2-pentene, 1-hexene, 2-hexene, etc.

The catalyst composition of the present invention comprises a hydrogen fluoride-carbon dioxide complex, said complex being formed due to the fact that hydrogen fluoride is miscible with the carbon dioxide. The hydrogen fluoride may be present in the catalyst complex in a range of from about 0.1 to about 95 weight percent of catalyst complex. In addition to the miscibility of the hydrogen fluoride with the carbon dioxide, in some instances it has been found that the reactant which is to undergo alkylation, isomerization, etc., may also be miscible with the carbon dioxide and thus a single phase may be used to effect the reaction. By utilizing this single phase, it is possible that a sizable reduction in the catalyst-reactant ratio may be effected as well as being able to utilize contact times It is contemplated within the scope of this invention that the organic reactions which are to be effected utilizing the hydrogen fluoride-carbon dioxide complex may be effected at temperatures ranging from about −20° C. up to about 150° C. and at pressures within the range of from about 10 to about 2000 pounds per square inch, the most important consideration being that the reaction be effected under optimum conditions so that the maximum amount of hydrogen fluoride is miscible with the carbon dioxide in the liquid phase.

The process of this invention may be effected in any suitable manner and may comprise either a batch or continuous type operation. For example, when a batch type operation is used, a quantity of the organic compound which is to be reacted is placed in an appropriate apparatus such as, for example, a stirred or rotated autoclave which contains the catalyst system comprising a hydrogen fluoride-carbon dioxide complex. If, for example, the organic reaction which is to be effected is an alkylation reaction, the alkylating agent is thereafter charged to the reactor which is maintained at the proper operating conditions of temperature and pressure for a predetermined residence time. At the end of this time, the reactor and contents thereof are allowed to return to room temperature and atmospheric pressure. At this point, when the vessel is returned to atmospheric pressure, the carbon dioxide and an appreciable amount of hydrogen fluoride will leave the reactor. The vessel is opened and the reaction mixture is separated from the remainder of the hydrogen fluoride in the catalyst system by conventional means and thereafter subjected to separation means such as fractional distillation, crystallization, etc., whereby the desired product which contains the modification of the products which are usually obtained with conventional catalysts is recovered.

It is also contemplated within the scope of this invention that the process may be effected in a continual manner of operation. When such a type of operation is used, a quantity of the organic reactants is continuously charged to the reaction zone which is maintained at the proper operating conditions of temperature and pressure. In addition, the catalyst complex is also continuously charged to the reaction zone through separate means. It is contemplated that the catalyst system may be prepared prior to entry into said reactor and charged thereto as a hydrogen fluoride-carbon dioxide complex, or the hydrogen fluoride and carbon dioxide may be charged to the reactor through separate means and admixed therein to form the catalyst complex in situ. Upon completion of the desired residence time, the reactor effluent is continuously withdrawn, the unreacted starting materials and catalyst complex are separated from the effluent and the latter is then subjected to fractionation means whereby the desired product is recovered.

The following examples are given to illustrate the process of the present invention which, however, are not intended to limit the generally broad scope of the present invention in strict accordance therewith.

EXAMPLE I

To illustrate the effect of utilizing a catalyst comprising hydrogen fluoride-carbon dioxide complex as the reaction modifying agent, an experiment was performed in which isobutane was alkylated with 1-butene. The experiment was performed in a 1 liter turbo mixer, the reactants being charged thereto while maintaining the turbo mixer at a reaction temperature of about 4° C. by means of an ice bath. In the first experiment only hydrogen fluoride was used as the alkylation catalyst. The turbo mixer was maintained at a pressure of 30 pounds per square inch for a total contact time of 65 minutes, 60 minutes of which was utilized by the addition of the reactants. The final ratio of isobutane to 1-butene was 10.5 moles of isobutane per mole of 1-butene. The results of this experiment are set forth in Table I below.

TABLE I

| | |
|---|---:|
| 1-$C_4H_8$ reacted, percent | 100 |
| Alkylate product/1-$C_4H_8$ Chg, wt. | 1.85 |
| Trimethylpentanes/Dimethylhexanes, wt. | 0.939 |
| Alkylated prod., Br Index | 30 |

Alkylated prod. composition, wt.-percent:

| | |
|---|---:|
| Isopentane | 0.2 |
| 2,3-dimethylbutane | 0.2 |
| 2-methylpentane | 0.2 |
| 2,4-dimethylpentane | 0.5 |
| 2,2,4-trimethylpentane | 18.9 |
| 2,2,3-trimethylpentane | 0.8 |
| 2,3,4-trimethylpentane | 16.5 |
| 2,3,3-trimethylpentane | 9.8 |
| 2,5-dimethylhexane | 1.6 |
| 2,4-dimethylhexane | 9.3 |
| 2,3-dimethylhexane | 38.1 |
| $C_9^+$ | 3.9 |
| | 100.0 |

EXAMPLE II

The following two experiments were effected using a hydrogen fluoride-carbon dioxide complex as a catalyst for the alkylation of the isobutane with 1-butene. In these two experiments, the results of which are set forth in Table II below, a 1 liter turbomixer was maintained at a temperature of 4° C. by means of an ice bath. The reactants were charged thereto during a period of 60 minutes. The final ratio of isobutane to 1-butene being 10.5 moles of isobutane per mole of 1-butene. In the first of these two experiments, the catalyst contained 26.5 weight percent of carbon dioxide of the carbon dioxide plus hydrogen fluoride inventory, while in the second of the two experiments the catalyst complex contained 48.5 weight percent of carbon dioxide of the carbon dioxide plus hydrogen fluoride inventory. The turbomixer was maintained under a pressure of 220 and 365 pounds per square inch respectively. After addition of the reactants had been completed, the mixture was stirred for an additional contact time of 5 minutes. At the end of this time, the turbomixer was vented and allowed to return to room temperature. The results of these two experiments are set forth in Table II below, the first experiment being in Column A while the results of the second experiment are set forth in Column B.

TABLE II

| | A | B |
|---|---:|---:|
| 1-$C_4H_8$ reacted, percent | 100 | 100 |
| Alkylate product/1-$C_4H_8$ chg, wt. | 1.95 | 1.89 |
| $Me_3$-pentanes/$Me_2$-hexanes, wt. | 1.29 | 1.30 |
| Alkylate prod., Br Index | 60 | 40 |
| Alkylate prod. composition, wt.-percent: | | |
| Isopentane | 0.2 | 0.3 |
| 2,3-dimethylbutane | 0.2 | 0.3 |
| 2-methylpentane | 0.2 | 0.2 |
| 2,4-dimethylpentane | 0.2 | 0.5 |
| 2,2,4-trimethylpentane | 30.3 | 30.4 |
| 2,2,3-trimethylpentane | 0.8 | 0.9 |
| 2,3,4-trimethylpentane | 14.4 | 14.9 |
| 2,3,3-trimethylpentane | 8.6 | 7.8 |
| 2,5-dimethylhexane | 1.6 | 1.5 |
| 2,4-dimethylhexane | 7.8 | 7.9 |
| 2,3-dimethylhexane | 32.7 | 32.1 |
| $C_9^+$ | 3.0 | 3.2 |
| Total | 100.0 | 100.0 |

It will be noted from a comparison of Tables I and II that the addition of carbon dioxide to the hydrogen fluoride whereby the hydrogen fluoride-carbon dioxide complex is formed as the catalytic composition of matter produced a beneficial effect of increasing the amount of trimethylpentanes present in the reaction product with a corresponding reduction in the amount of dimethylhexanes. In the absence of carbon dioxide as a component of the catalyst complex the trimethylpentane/dimethylhexane weight ratio equaled 0.94; with the addition of the carbon dioxide in amounts ranging from 26 to 48 weight percent of the catalyst inventory this ratio increased to 1.30. This increase calculates to an octane rating increase of approximately 2 octane numbers and will therefore be important when the object is to produce compounds which are utilizable as motor fuels.

EXAMPLE III

In this example, a 1 liter turbomixer containing benzene is charged with a hydrogen fluoride-carbon dioxide catalyst complex which contains about 30 weight percent of carbon dioxide of the hydrogen fluoride inventory. The turbomixer is maintained at a temperature of about 5° C. by means of an ice bath while the alkylating agent comprising propylene is charged thereto. The addition is completed during a period of about 60 minutes while maintaining the turbomixer under a pressure of about 200 pounds per square inch. The reaction mixture is continuously stirred during the addition period and for an additional contact time of about 5 minutes. At the end of this time, the mixer is vented and allowed to return to room temperature. After separation of the catalyst layer, the organic layer is subjected to fractional distillation and the desired product comprising isopropylbenzene (cumene) is recovered.

EXAMPLE IV

An experiment similar to that described in Example II above is effected by reacting isopentane with 1-butene in the presence of a catalyst comprising a hydrogen fluoride-carbon dioxide complex. The reaction is effected in a turbomixer which is continuously stirred and which is maintained at a temperature of about 5° C. by means of an ice bath and a pressure of about 300 pounds per square inch. The products which are recovered from the reaction mixture will consist of a major portion of trimethylhexanes.

EXAMPLE V

In this example, a 1 liter turbomixer is maintained at a temperature of about 5° C. by means of an ice bath. To this turbomixer is added phenol and a catalyst comprising about 48 weight percent carbon dioxide of the hydrogen fluoride inventory. The desired alkylating agent comprising propylene charged thereto during a period of about 60 minutes. At the end of this time, the reaction mixture is stirred for an additional period of 5 minutes, following which the reactor is allowed to warm to room temperature and is vented. The reaction mixture is separated from the catalyst layer, neutralized by conventional means and subjected to fractional distillation, the desired product comprising propylphenol being recovered therefrom.

I claim as my invention:

1. In a process for the liquid phase alkylation of an alkylatable compound selected from the group consisting of paraffins and isoparaffins by condensing said compound with an olefinic hydrocarbon in the presence of an alkylation catalyst at a temperature of about $-20°$ C. to about $150°$ C. and a pressure of about 10 to about 2000 p.s.i., the improvement which comprises utilizing as said catalyst a hydrogen fluoride-carbon dioxide complex containing from about 0.1 to about 95 wt. percent hydrogen fluoride.

2. The process as set forth in claim 1, further characterized in that said alkylatable compound comprises isobutane, said olefinic hydrocarbon comprises a butene and that a major portion of the alkylated hydrocarbon product of said process comprises trimethylpentanes.

3. The process as set forth in claim 1, further characterized in that said alkylatable compound comprises isopentane, said olefinic hydrocarbon comprises a butene and the product of said process comprises trimethylhexane.

4. The process as set forth in claim 1, further characterized in that said alkylatable compound comprises isobutane, said olefinic hydrocarbon comprises propylene and that a major portion of the alkylated hydrocarbon product of said process comprises trimethylpentanes.

References Cited

UNITED STATES PATENTS

| | | | |
|---|---|---|---|
| 2,275,312 | 3/1942 | Tinker et al. | 260—624 |
| 2,910,522 | 10/1959 | Gerhold et al. | 260—624 |
| 2,423,470 | 7/1947 | Simmons | 260—624 |

BERNARD HELFIN, Primary Examiner

W. B. LONE, Assistant Examiner

U.S. Cl. X.R.

252—434; 260—624, 671